United States Patent [19]
Masuda

[11] 4,275,758
[45] Jun. 30, 1981

[54] PRESSURE CONTROL VALVE ASSEMBLY

[75] Inventor: Kenji Masuda, Takatsuki, Japan

[73] Assignee: Daikin Kogyo Co., Ltd., Osaka, Japan

[21] Appl. No.: 107,620

[22] Filed: Dec. 27, 1979

[30] Foreign Application Priority Data

Dec. 28, 1978 [JP] Japan .................. 53/162962
Nov. 14, 1979 [JP] Japan .................. 54/148028

[51] Int. Cl.³ ............................................. F16K 17/06
[52] U.S. Cl. ..................................... 137/489; 137/494
[58] Field of Search ................ 137/494, 508, 529, 489

[56] References Cited

U.S. PATENT DOCUMENTS

| | | | |
|---|---|---|---|
| 2,667,893 | 2/1954 | Kupiec | 137/494 |
| 3,578,018 | 5/1971 | Dillon | 137/489 |
| 3,744,515 | 7/1973 | Inoue | 137/494 |
| 4,074,695 | 2/1978 | Weirich | 137/508 |

FOREIGN PATENT DOCUMENTS

796100 6/1958 United Kingdom .

*Primary Examiner*—Robert G. Nilson
*Attorney, Agent, or Firm*—Wenderoth, Lind & Ponack

[57] ABSTRACT

A pressure control valve assembly for controlling the fluid pressure in an external fluid circuit at a predetermined or required pressure equal to or smaller than the set pressure comprises a valve housing having a movable valve seat member supported therein for axial movement relative to the valve housing, a valving member having a valve or poppet element normally seated against the movable valve seat member and closing a discharge path, a primary biasing spring for biasing the poppet element against the movable valve seat member and a set pressure adjustment exerting an axial pushing force on the movable valve seat member. By the operation of the set pressure adjustment, the valve assembly can be set to operate at a required pressure and in this condition, the movable valve seat member is held in a state of equilibrium.

21 Claims, 8 Drawing Figures

PRESSURE CONTROL VALVE ASSEMBLY

The present invention generally relates to a pressure control valve assembly and, more particularly, to a pressure relief valve assembly.

Various types of pressure relief valve assemblies are known to those skilled in the art. Of them, a direct acting relief valve assembly is known as means suited for maintaining a pressure in a fluid circuit at a required value throughout the operation thereof and for regulating the maximum pressure in the fluid circuit to a value equal to the set pressure thereof.

The conventional direct acting relief valve assembly comprises a fixed valve seat member having a passage defined therein, a poppet member of generally conical configuration seated against one end of the passage in the fixed valve seat member, and a biasing spring used to bias the poppet member to seat against one end of the passage. In this construction, when the fluid pressure introduced into the direct acting relief valve assembly overcomes the biasing force of the biasing spring, the poppet member is separated from the fixed valve seat member to open the passage to establish a discharge path leading from the inlet port to the outlet port by way of the passage defined in the fixed valve seat member.

Since the conventional direct acting relief valve assembly is a spring loaded type in which the biasing spring and the fluid pressure so introduced are counterbalanced with each other, the poppet member is firmly seated against the fixed valve seat member before the fluid pressure in the external fluid circuit attains a value equal to the set pressure of the relief valve assembly.

In view of the above, in the conventional direct acting relief valve assembly, if the fluid pressure in the external fluid circuit increases abruptly to such an extent as to exceed the set pressure of the valve assembly, the poppet member closing the passage in the fixed valve seat member must be disengaged from the fixed valve seat member to open the passage so that an excessive fluid pressure in excess of the set pressure of the valve assembly can be discharged to the outside of the valve assembly, for example, an external fluid reservoir. However, prior to completion of displacement of the poppet member in a direction away from the fixed valve seat member, the fluid pressure supplied to the fluid inlet port of the valve assembly further increases. In other words, the conventional direct acting relief valve assembly involves a delay in response and, therefore, the poppet member does not quickly respond to the increased fluid pressure at the fluid inlet port. Accordingly, it has often occurred that a surge pressure in excess of the set pressure of the valve assembly is generated, such generation of the surge pressure being undesirable in that it may lead to damage to the external fluid circuit and/or fluid-operated equipment.

Moreover, in the conventional direct acting relief valve assembly of the type referred to above, because of the spring loaded type, if an effective surface area of the poppet member on which the fluid pressure acts is increased, the rate of discharge of the fluid medium through the relief valve assembly to the external reservoir can correspondingly be increased. Though this is a feasible feature, the biasing spring used must be of a type having a relatively large spring constant. This means that, where the set pressure of the valve assembly is desired to be adjusted, a relatively large operating force corresponding to the amount of the fluid pressure acting on the effective pressure receiving surface of the poppet member must be applied to the poppet member.

The disadvantages and inconveniences inherent in the conventional direct acting relief valve assembly equally apply to the conventional pilot operated relief valve assembly of a type including a pilot valve combined with the direct acting relief valve assembly.

Accordingly, the present invention has been made to substantially eliminate the disadvantages and inconveniences inherent in the prior art pressure control valve assembly and is intended to provide an improved pressure control valve assembly having a reliable, quick response characteristic with respect to variation in pressure in an external fluid circuit to be controlled.

Another important object of the present invention is to provide an improved pressure control valve assembly of the type referred to above, which is effective to prevent the generation of the surge pressure in excess of the set pressure of the valve assembly.

A further object of the present invention is to provide an improved pressure control valve assembly of the type referred to above, wherein an electromagnetic actuator is utilized as means for adjusting the set pressure of the valve assembly and which can, therefore, be utilized as a remote controlled pressure relief valve assembly.

A still further object of the present invention is to provide an improved pressure control valve assembly of the type referred to above, which is free from any possible generation of chattering sounds and any other obnoxious noises.

A still further object of the present invention is to provide an improved pressure control valve assembly of the type referred to above, which can advantageously be employed as a pilot valve for a pilot operated relief valve assembly.

A still further object of the present invention is to provide an improved pressure control valve assembly of the type referred to above, which requires a minimized amount of force in carrying out the adjustment of the set pressure of the valve assembly and, therefore, can be manufactured to have a large volume discharge capability.

These and other objects and features of the present invention will become apparent from the following description taken in conjunction with preferred embodiments thereof with reference to the accompanying drawings, in which.

Before the description of the present invention proceeds, it is to be noted that like parts are designated by like reference numerals throughout the accompanying drawings.

Figure 1:
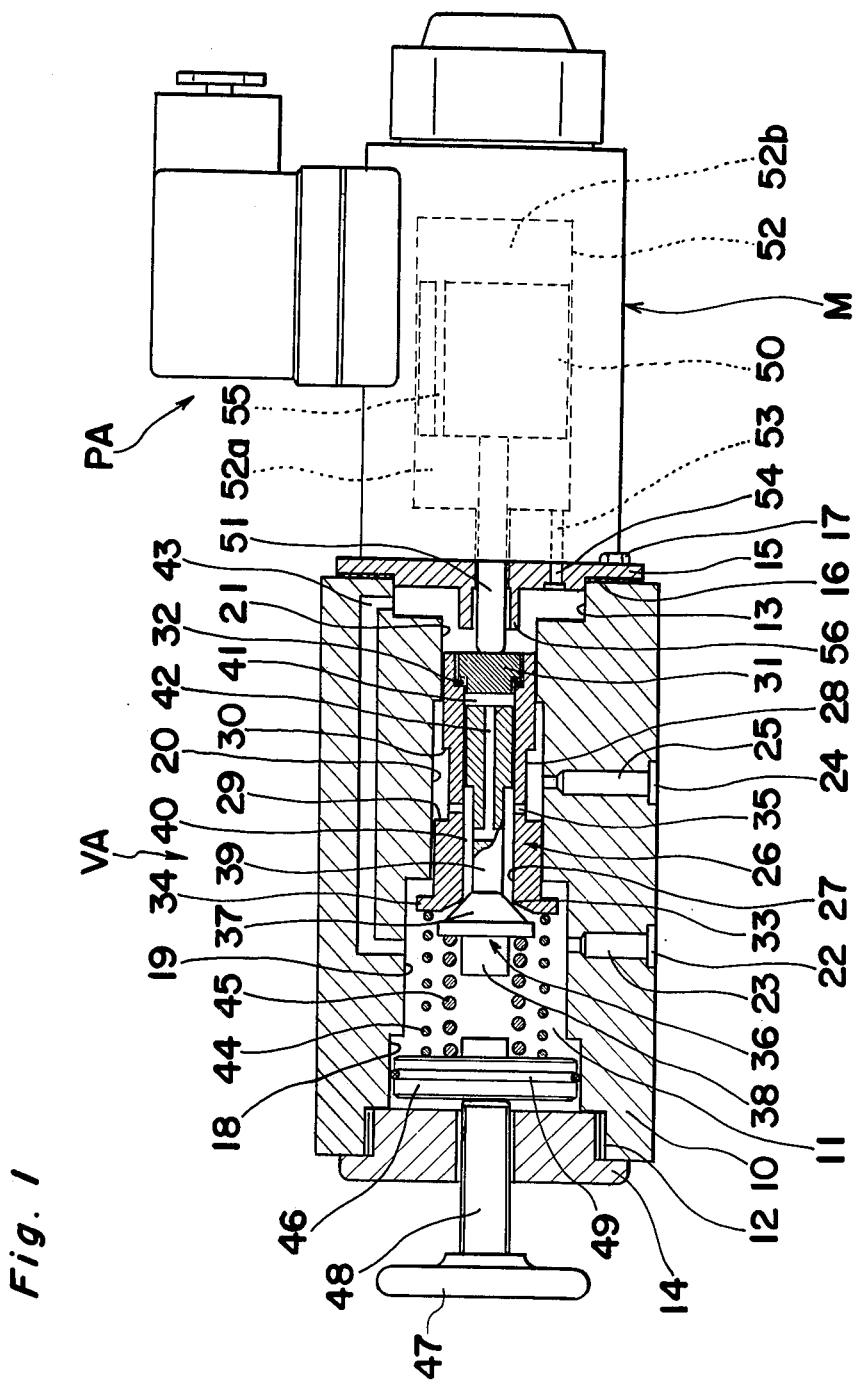
FIG. 1 is a longitudinal sectional view of a pressure control valve assembly according to a first preferred embodiment of the present invention.

Referring first to FIG. 1, wherein a pressure relief valve assembly according to a first preferred embodiment of the present invention is shown in the form of an electromagnetically controlled presssure relief valve assembly, the valve assembly comprises a valve body VA, comprised of a valve housing 10 of generally cylindrical configuration, and a set pressure adjustment PA employed in the form of an electromagnetic unit of a type which will be described later and which is rigidly secured in end-to-end relation to the valve housing 10. The valve housing 10 has an axially extending hollow 11 defined therein and having opposite ends which are enlarged in diameter at 12 and 13 to provide respective closure receiving spaces and which are closed in fluid-tight manner by respective flanged end plates 14 and 15. As shown, the flanged end plate 14 is tightly threaded into the enlarged space 12 and secured to one end of the valve housing 10 remote from the set pressure adjustment PA and the flanged end plate 15 is rigidly secured to the other end of the valve housing 10 adjacent the set pressure adjustment PA through any suitable gasket 16 by the use of a plurality of set screws, only one of which is shown by 17.

The axially extending hollow 11 within the valve housing 10 is essentially constituted by a disc chamber 18 positioned adjacent the end plate 14, a valve chamber 19 positioned on one side of the disc chamber 18 remote from the end plate 14 and having a diameter which may be smaller than or equal to that of the disc chamber 18, a supply chamber 20 positioned on one side of the valve chamber 19 remote from the disc chamber 18, and a varying volume chamber 21 positioned adjacent the end plate 15 and on one side of the supply chamber 20 remote from the valve chamber 19, said varying volume chamber 21 having a diameter which may be smaller than or equal to that of the enlarged space 13. All of these chambers 18 to 21 extend in coaxial relation to each other in a direction lengthwise of the valve housing 10. It is to be noted that, for a reason which will become clear from the subsequent description, the diameter of the supply chamber 20 should be larger than that of the varying volume chamber 21, but may be equal to or smaller than that of the valve chamber 19. However, so far as illustrated in FIG. 1, the supply chamber 20 is shown as having the diameter smaller than that of the valve chamber 19.

The valve housing 10 also has defined therein a fluid outlet port 22 communicated to the valve chamber 19 through an outlet passage 23, a fluid inlet port 24 communicated to the supply chamber 20 through an inlet passage 25. While the fluid outlet port 22 is adapted to be fluid-connected to a fluid reservoir, which may be the atmosphere or a storage vessel if a fluid medium with which the pressure relief valve assembly of the present invention is operated is air or hydraulic medium, respectively, the fluid inlet port 24 is adapted to be fluid-connected to a fluid circuit having the fluid medium, the pressure of which is to be controlled by the pressure relief valve assembly of the present invention, flows therethrough.

The pressure relief valve assembly includes an elongated movable valve seat member 26 of substantially sleeve-like configuration having an axially extending through hole 27 defined therein and operatively accommodated within the axially extending hollow 11 in the valve housing 10. More specifically, this movable valve seat member 26 has one end axially slidably positioned within the varying volume chamber 21 and the other end axially slidably positioned within the supply chamber 20 and protruding outwards therefrom into the valve chamber 19, and for this purpose one end portion of the movable valve seat member 26 adjacent the end plate 15 has an outer diameter substantially equal to or slightly smaller than the diameter of the varying volume chamber 21 while the other end portion of the movable valve seat member 26 adjacent the end plate 14 has an outer diameter substantially equal to or slightly smaller than the diameter of the supply chamber 20. A substantially intermediate portion of the movable valve seat member 26 is radially inwardly recessed at 28 to provide a pair of oppositely facing annular faces 29 and 30 of different size, said annular face 29 being positioned at the boundary between the end portion of the movable valve seat member 26 adjacent the end plate 14 and the radially inwardly recessed portion 28 thereof and said annular land 30 being positioned at the boundary between the end portion of the movable valve seat member 26 adjacent the end plate 15 and the radially inwardly recessed portion 28 thereof.

The movable valve seat assembly 26 has a plug 31 rigidly and tightly secured to one end of the movable valve seat member 26 by the intervention of a copper gasket 32 in any suitable manner, for example, by threading, to close one of the opposed openings of the through-hole 27. An inner peripheral edge portion of the movable valve seat member 26 which defines the other of the opposed openings of the through-hole 27 is chamfered to provide a valve seat 33 on one hand and an outer peripheral edge portion of the same movable valve seat member 26 in opposition to the valve seat 33 is formed with a radially outwardly extending annular spring seat 34 on the other hand.

The movable valve seat member 26 also has one or more connecting passages 35 defined therein and extending radially of the movable valve seat member 26, through said connecting passages 35 the supply chamber 20 and the through-hole 27 are communicated to each other.

The pressure relief valve assembly also includes a valving body generally identified by 36 and comprised of a valve or poppet member 37 of substantially conical shape situated within the valve chamber 19 in coaxially aligned relation to the movable valve seat members 26, a stem 38 protruding from the poppet member 37 in a direction facing towards the end plate 14, and an elongated, cylindrical slider 39 having one end rigidly connected to, or otherwise formed integrally with, an apex portion of the poppet member 37 and axially movably housed within the through-hole 27. It is to be noted that one end portion of the slider 39 adjacent the poppet member 37 is reduced in diameter to define an annular working chamber 40, which in essence forms a part of the through-hole 27 in the movable valve seat member 26, in cooperation with the peripheral surface of the through-hole 27. It is also to be noted that the valving body 36 of the construction described above is so sized that a working chamber can be defined at 41 between the plug 31 and one end of the slider 39 remote from the poppet body 37 when and so long as the poppet member 37 is seated against the valve seat 33 with its apex portion protruding into the through-hole 27 in the movable valve seat member 26 in a manner as shown in FIG. 1.

The slider 39 of the valving body 36 has a generally T-shaped passage 42 defined therein for communicating the annular working chamber 40 to the working chamber 41 so that a portion of the fluid medium supplied into the annular working chamber 40 can be introduced into the working chamber 41 when and so long as the poppet member 37 is seated against the valve seat 33.

For the purpose as will be described later, the valve housing 10 has a connecting passage 43 having one end opening into the valve chamber 19 and the other end opening into the enlarged space 13 and, hence, the varying volume chamber 21, a substantially intermediate portion thereof being defined in the valve housing 10.

Operatively housed within the valve chamber 19 are first and second biasing springs 44 and 45 each being employed in the form of a compression spring, said first biasing spring 44 being of a type having a spring constant far smaller than that of the second biasing spring 45 so far illustrated. The first biasing spring 44 is interposed between the spring seat 34 fast with the movable valve seat member 26 and a piston disc 46, housed within the disc chamber 18, for biasing the movable valve seat member 26 in a direction rightwards as viewed in FIG. 1 or in a direction towards the end plate 15 whereas the second biasing spring 45 is interposed between the poppet member 37 and the piston disc 46 for biasing the poppet member 37 against the valve seat 33.

The piston disc 46 and a manipulatable handle 47 having an externally threaded rod 48 having one end rigidly connected to, or otherwise formed integrally with, the handle 47 and the other end adjustably extending through the end plate 14 and held in contact with the piston disc 46 form respective parts of an emergency set pressure adjustment which is manipulated in case of emergency, for example, when the electromagnetic unit for the set pressure adjustment PA fails to operate because of interruption of supply of an electric power thereto and/or because of breakdown of one or more components of the electromagnetic unit. More specifically, when the electromagnetic unit for the set pressure adjustment PA malfunctions, by turning the manipulatable handle 47 in either direction about the threaded rod 48, the piston disc 46 is displaced in a direction axially of the hollow 11 to adjust the respective amounts of energies accumulated in the first and second biasing springs 44 and 45, that is, to adjust the set pressure at which the poppet member 37 disengages from the valve seat 33. This emergency set pressure adjustment may also be utilized for the purpose of fine adjustment of the set pressure to be done subsequent to the assemblage and/or for the purpose of cancelling any possible deviation in performance which would result from machining errors during the assemblage.

However, if desired or should a particular application permit, the emergency set pressure adjustment referred to above may be deleted and, in this case, the respective ends of the first and second biasing springs 44 and 45 opposite to the movable valve seat member 26 and the poppet member 37 may be engaged to the end plate 14.

For avoiding leakage of the fluid medium from the valve chamber 19 into a space defined between the end plate 14 and the piston disc 46, the piston disc 46 has a sealing ring 49 received in a groove defined on the peripheral face of the piston disc 46.

In the construction so far described above, the sum of the surface area of an inside surface of the plug 31 facing the working chamber 41 and that of the annular land 30 is selected to be equal to the surface area of the annular land 29 so that the pressure introduced into the supply chamber 20 from the fluid inlet port 24 by way of the inlet passage 25 will not cause the movable valve seat member 26 to move axially relative to the valving body 36, thereby holding the movable valve seat member 26 in a state of equilibrium relative to the valve housing 10. It is to be noted that the generally T-shaped passage 42 defined in the slider 39 of the valving body 36 constitutes an orifice for controlling the rate of flow of a fluid medium from the annular working chamber 40 into the working chamber 41.

The pressure relief valve assembly of the construction so far described is so designed that, when the pressure introduced into the working chamber 41 from the fluid inlet port 24 first through the connecting passage 35, then through the annular working chamber 40 and finally through the orifice or T-shaped passage 42 overcomes the biasing force of the second biasing spring 45, the valving body 36 is axially displaced against the second biasing spring 45 with the poppet member 37 disengaging from the valve seat 33, thereby establishing a discharge path through which an excessive pressure, that is, a surge pressure, is discharged through the fluid outlet port 22 by way of the outlet passage 23, said discharge path including the supply chamber 20, the connecting passages 35, the annular working chamber 40 and the valve chamber 19.

Referring still to FIG. 1, the electromagnetic unit for the set pressure adjustment PA, generally identified by M, includes a wet armature 50 and a solenoid (not shown) and is preferably of a type capable of exerting a magnetic force, particularly a magnetic attractive force, of a magnitude proportional to the amount of a DC current supplied to the solenoid built in the electromagnetic unit M, said magnetic attractive force of the definite magnitude acting on the wet armature 50 constantly throughout the entire stroke of movement of the armature 50. With the electromagnetic unit M so secured to the valve housing 10 in the manner described hereinbefore, the armature 50 is connected to the movable valve seat member 26 through a push rod 51 having one end connected to the armature 50 and the other end held in contact with the plug 31 or the closed end of the movable valve seat member 26.

The compartment 52 of the electromagnetic unit in which the armature 50 is operatively and movably housed is filled with a fluid medium and, for this purpose, the compartment 52 is communicated through a passage 53 and then through a passage 54, defined in the end plate 15, to the varying volume chamber 21 which is in turn communicated to the valve chamber 19 through the connecting passage 43. Furthermore, since the compartment 52 is divided into two sections 52a and 52b by the armature 50 as shown, these two sections 52a and 52b must be fluid-connected to each other and, for this purpose, the armature 50 has a passage 55 defined therein so that the back pressure prevailing in the valve chamber 19 can be transmitted to the section 52b of the compartment 52 to counterbalance the pressure acting within the working chamber 21 on the push rod 51.

The valve body VA and the electromagnetic unit M are so operatively associated with each other as to determine the set pressure of the pressure relief valve assembly in a manner as can readily be understood from the following description concerning the operation of the pressure relief valve assembly of the construction described with reference to and shown in FIG. 1.

FIG. 1 illustrates the condition of the pressure relief valve assembly when the pressure of, for example, 70 kg/cm$^2$ is introduced into the fluid inlet port 24 while the DC current of a value required to set the pressure relief valve assembly to start its pressure relief operation at, for example, 140 kg/cm$^2$ is applied to the solenoid. It is to be noted that, although the second biasing spring 45 is of a type having a spring constant larger than that of the first biasing spring 44, the biasing force exerted by the second biasing spring 45 is larger than the pushing force exerted by the armature 50 upon energization of the solenoid and acting through the push rod 51 on the movable valve seat member 26 to move the latter towards the left. Accordingly, when and so long as no electric current is applied to the solenoid in the electromagnetic unit M and, at the same time, no fluid medium is supplied into the valve body VA through the fluid inlet port 24, the movable valve seat member 26 is displaced to the right by the action of the first biasing spring 44 with the plug 31 held in contact with an annular stop 56 fast with the end plate 15 and, at the same time, the valving body 36 is also displaced to the right by the action of the second biasing spring 45 with the poppet member 37 seated against the valve seat 33.

On the other hand, when the electric DC current of a value corresponding to the set pressure of 140 kg/cm$^2$ is applied to the solenoid in the electromagnetic unit M while the pressure has not yet been introduced into the fluid inlet port 24, the solenoid exerts the magnetic attractive force of a magnitude proportional to the applied current and, therefore, the armature 50, hence, the push rod 51, exerts an axially pushing force to move the movable valve seat member 26 towards the left. However, since the biasing force of the second biasing spring 45, which is transmitted to the movable valve seat member 26 through the poppet member 37 then seated against the valve seat 33, is larger than the axially pushing force of the push rod 51 as hereinbefore described, the movable valve seat member 26 will not move substantially.

When the fluid medium is supplied to the fluid inlet port 24 while the solenoid in the electromagnetic unit M is energized by the application of the electric current as hereinbefore described, the fluid medium so supplied is introduced into the working chamber 41 by way of the supply chamber 20, the connecting passage 35, the annular working chamber 40 and the T-shaped passage 42 and, consequently, the pressure within the working chamber 41 acts to bias the valving body 36 towards the left relative to the movable valve seat member 26.

With the valving body 36 so axially moved towards the left, the second biasing spring 45 is axially inwardly compressed with the poppet member 37 tending to disengage from the valve seat 33. Where the pressure so applied increases at a relatively small gradient such as shown by a curve A in a graph of FIG. 2, the movable valve seat member 26 is axially displaced towards the left immediately by the action of the axially pushing force of the push rod 51 against the first biasing spring 44 in pursuit of the valving body 36 being then axially displaced towards the left by the action of the pressure within the working chamber 41. Accordingly, there is no change for the poppet member 37 to disengage from the valve seat 33 and, as a whole, the movable valve seat member 26 and the valving body 36 are axially moved together and in unison with each other towards the left.

When the pressure at the fluid inlet port 24 which is increasing in the manner as shown by the curve A in the graph of FIG. 2 subsequently attains the set pressure, that is, 140 kg/cm$^2$ in this example, of the pressure relief valve assembly, the axially pushing force of the push rod 51 becomes counterbalanced with the biasing force of the first biasing spring 44 which has been axially inwardly compressed by the movement of the movable valve seat member 26 towards the left as hereinbefore described, thereby holding the movable valve seat member 26 in a state of equilibrium.

In view of the above, after the movable valve seat member 26 has been brought into the state of equilibrium in the manner described above, any slightest increase of the pressure of the fluid medium introduced into the valve body VA through the fluid inlet port 24 in excess of the set pressure results in a further axial displacement of the valving body 36 towards the left relative to the movable valve seat member 26 with the poppet member 37 consequently disengaged from the valve seat 33, thereby establishing the discharge path including the supply chamber 20, the connecting passage 35, the annular working chamber 40, the valve chamber 19 and the fluid outlet passage 23. Once this discharge path is established, the pressure in the fluid circuit with which the fluid inlet port 24 is fluid-connected can be maintained at a predetermined or required pressure equal to the set pressure of the pressure relief valve assembly.

Figure 2:
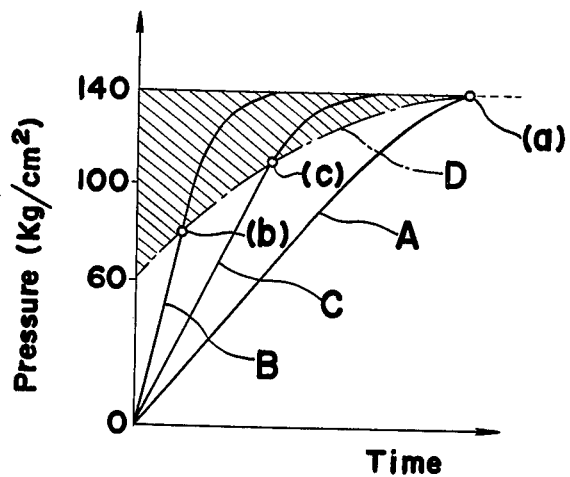
FIG. 2 is a graph illustrating different times at which a poppet member disengages from a movable valve seat member according to different fluid pressures, showing a characteristic of the valve assembly of the present invention.

As hereinbefore described, where the gradient of increase of the pressure supplied to the pressure relief valve assembly is relatively small such as shown by the curve A in the graph of FIG. 2, the poppet member 37 is disengaged from the valve seat 33 only when the pressure in the fluid circuit exceeds the set pressure as shown by the point (a) in the graph of FIG. 2.

However, where the gradient of increase of the pressure supplied to the pressure relief valve assembly is relatively large such as shown by a curve B in the graph of FIG. 2, the poppet member 37 is disengaged from the valve seat 33 to establish the discharge path before the pressure then rapidly increasing in the manner as shown by the curve B in the graph of FIG. 2 attains a value equal to the set pressure of the relief valve assembly, for example, at about 75 kg/cm$^2$ as shown by the point (b) in the graph of FIG. 2. More specifically, as hereinbefore described, the axially leftward movement of the valving body 36 effected by the introduction of the pressure into the working chamber 41 is followed by the corresponding axially leftward movement of the movable valve seat member 26 by the action of the axially pushing force of the push rod 51. However, the velocity of axially leftward movement of the valving body 36 is high as compared with the case when the slowly increasing pressure such as shown by the curve A in the graph of FIG. 2 is introduced into the working chamber 41 on one hand and, on the other hand, the axially leftward movement of the movable valve seat member 26 in pursuit of the valving body 36 is somewhat delayed because a delay element acts on the movable valve seat member 26. This delay element is constituted by the axially pushing force of the push rod 51 which is considerably smaller than the pressure acting on the valving body 36, the mass of the movable valve seat member 26 which is relatively large for the given axially pushing force of the push rod 51, various flow resistances acting on the movable valve seat member 26 and the armature 50 and acting in the passages 54 and 55, and various frictional resistances acting on the movable valve seat member 26 and the armature 50.

Because the axially leftward movement of the movable valve seat member 26 in pursuit of the valving body 36 is somewhat delayed for the rate of rapid increase of the pressure acting in the working chamber 41 as hereinbefore described, the pressure relief operation starts when the rapidly increasing pressure attains a value, that is, about 75 kg/cm² in this example, which is lower than the set pressure of the pressure relief valve assembly, thereby substantially eliminating any possible generation of the surge pressure such as occurring in the prior art pressure relief valve assembly.

It is to be noted that, during the axially leftward movement of the movable valve seat member 26 that takes place in pursuit of the valving body 36, the back pressure in the valve chamber 19 is transmitted to both the closed end of the movable valve seat member 26 and the peripheral surface of the push rod 51 through the passage 43 and also to the peripheral surface of the armature 50 through the passages 54 and 52. Because of this, the movement of any one of the movable valve seat member 26 and the push rod 51 would not be adversely affected by the back pressure developed in the valve chamber 19, thereby eliminating the possibility that the axially leftward movement of the movable valve seat member 26 is excessively delayed. Because of the employment of the passage 43, the pressure relief valve assembly according to the present invention has a quick response characteristic to the increase of pressure supplied thereto and can operate stably and accurately with no possibility that any possible variation of the back pressure adversely affects the axially leftward movement of the movable valve seat member 26. It is also to be noted that the passage 43 also serves as a drain passage for draining the fluid medium within the working chamber 21 and the enlarged space 13 to the outside of the pressure relief valve assembly through the fluid outlet port 22 when the movable valve seat member 26 is axially moved towards the right, that is, in a direction close towards the end plate 15.

When the rapidly increasing pressure supplied to the pressure relief valve assembly subsequently attains a value equal to the set pressure, that is, 140 kg/cm² in this example, of the pressure relief valve assembly, the movable valve seat member 26 is brought into the state of equilibrium wherein the biasing force of the first biasing spring 44 is counterbalanced with the axially pushing force of the push rod 51. At this time, the poppet member 37 undergoes a reciprocal axial movement relative to the valve seat 33 in the movable valve seat member 26, then held in the state of equilibrium, in response to the pressure supplied to the fluid inlet port 24 to discharge the excessive pressure to the outside of the pressure relief valve assembly through the fluid outlet port 22 and, thereafter, ceases its reciprocal axial movement. This reciprocal axial movement of the poppet member 37 relative to the valve seat 33 in the movable valve seat member 26 takes place steadily and stably because of the employment of the elongated slider 39 fast with the poppet member 37, which slider 39 is axially movably guided within the through-hole 27 in the movable valve seat member 26 and having the orifice or T-shaped passage 42 defined therein. More specifically, the slider 39 itself serves to guide the poppet member 37 to move exactly in alignment with the longitudinal axis of the movable valve seat member 26 without laterally displacing on one hand and the T-shaped passage 42 defined in the slider 39 serves to control the rate of flow of the fluid medium flowing into the working chamber 41 during the axial movement of the slider 39 relative to the movable valve seat member 26, thereby imposing a braking effect on the movement of the poppet member 37. Because of the above feature, not only does the poppet member 37 undergo chattering, but also the pressure relief valve assembly of the present invention will generate no undesirable and abnormal sounds which would result from unstable movement and chattering of the poppet member 37.

A curve C shown in the graph of FIG. 2 illustrates the gradient of increase of the pressure which is substantially intermediate between that represented by the curve A and that represented by the curve B. Where the pressure, the gradient of increase of which is shown by the curve C, is supplied to the pressure relief valve assembly of the present invention, since the velocity of movement of the valving body 36 in such a direction as to cause the poppet member 37 to disengage from the valve seat 33 is lower than that in the case where the rapidly increasing pressure represented by the curve B is supplied, the poppet member 37 is disengaged from the valve seat 33 when the pressure supplied thereto attains a value, such as shown by the point (c) in the graph of FIG. 2, which is higher than the pressure (b). In particular, the hatched area in the graph of FIG. 2, surrounded by the axis of ordinates, the line drawn at right angles to the axis of ordinates and passing through the level of the set pressure and a curve D passing through the point (a), (c) and (b), represents the area in which the poppet member 37 is disengaged from the valve seat 33 to establish the discharge path.

However, as hereinbefore described, the set pressure of the pressure relief valve assembly of the present invention is adjustable by varying the amount of electric DC current applied to the solenoid in the electromagnetic unit M. More specifically, the set pressure of the pressure relief valve assembly is determined depending upon the position of the movable valve seat member 26 where it is held in the state of equilibrium, that is, where the biasing force of the first biasing spring 44 is counterbalanced with the axially pushing force of the push rod 51. Accordingly, irrespective of the entire surface area of the valving body 36 on which the pressure supplied through the fluid inlet port 24 acts and, hence, irrespective of the magnitude of the biasing force of the first biasing spring 44, the pressure relief valve assembly can be set to operate at a required pressure only by adjusting the amount of electric DC current supplied to the solenoid in the electromagnetic unit M.

It is to be noted that, in the foregoing description, the slider 39 has been described as having the orifice or T-shaped passage 42 defined therein. In this case, the outer diameter of the slider 39 must be substantially equal to or slightly smaller than the diameter of the through-hole 27 in the movable valve seat member 26. However, the orifice or T-shaped passage 42 may not be always necessary and may be deleted, in which case the diameter of the slider 39 must be smaller than the diameter of the through hole 27 in the movable valve seat member 26, such as shown in FIG. 3, so that an annular clearance 57 which is a functional equivalent of the T-shaped passage 42 employed in the construction shown in FIG. 1 can be defined between the slider 39 and the peripheral surface of the through-hole 27.

Figure 3:
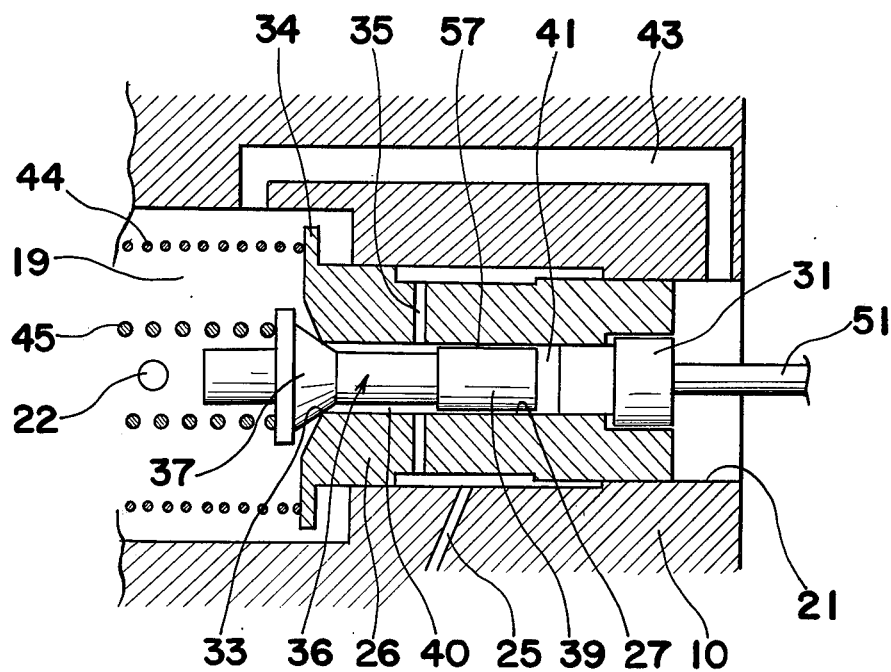
FIGS. 3 to 7 are views similar to FIG. 1, showing different embodiments of the present invention.

In addition, in any one of the foregoing embodiments shown respectively in FIGS. 1 and 3, if the sum of the surface area of the inside surface of the plug 31 facing the working chamber 41 and that of the annular face 30 in the movable valve seat member 26 is so selected as to be larger than the surface area of the annular face 29 in the movable valve seat member 26 and in opposed relation to the annular face 30, the first biasing spring 44 may be eliminated. In this case, when the pressure supplied into the pressure relief valve assembly attains a value equal to the set pressure of such valve assembly, the pressure difference ΔP given by the equation of $\Delta P = P(S_1 + S_2) - PS_3$ (wherein P represents the fluid pressure, $S_1$ and $S_3$ represent the respective surface areas of the annular faces 30 and 29, and $S_2$ represents the surface area of the inside surface of the plug 31 facing the working chamber 41) is counterbalanced with the axially pushing force of the push rod 51, thereby holding the movable valve seat member 26 in the state of equilibrium.

In any one of the foregoing embodiments shown respectively in FIGS. 1 and 3, the valving body 36 has been described and shown as of one-piece construction together with the valve or poppet member 37. However, the valving body may be of two-piece construction and this will now be described with particular reference to FIG. 4.

Figure 4:
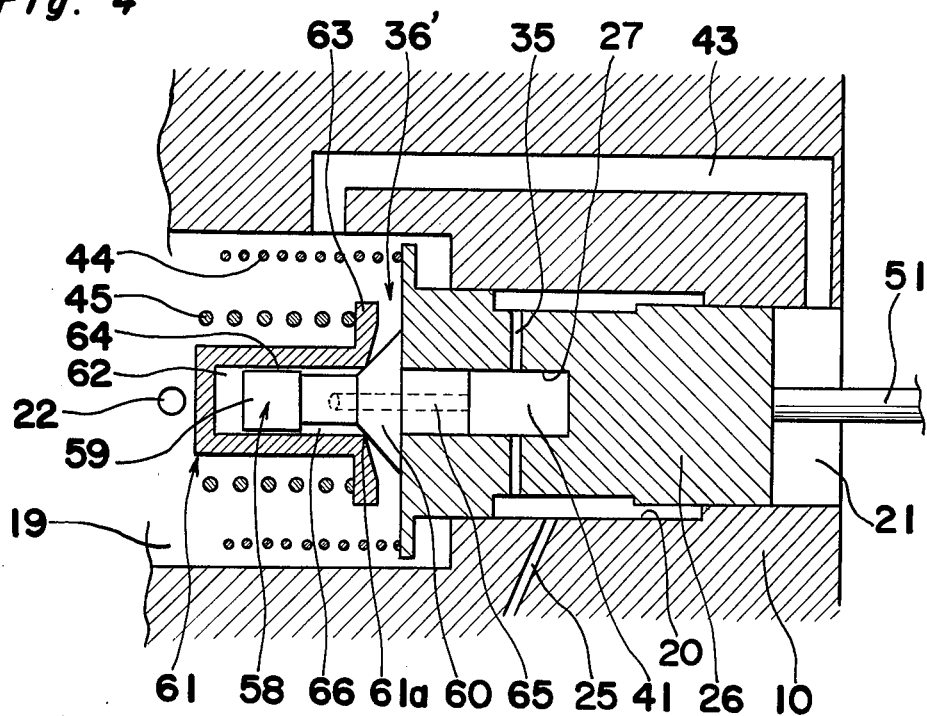

Referring now to FIG. 4, the valving body, generally identified by 36', comprises an elongated guide rod 58 having one end enlarged in diameter to provide a guide block 59 and a valve seat element 60 of substantially frusto-conical shape formed on the guide rod 58 adjacent the other end of said guide rod 58 and extending radially outwardly therefrom, and a substantially cup-like valve member 61. The guide rod 58 is rigidly supported by the movable valve seat member 26 with said other end thereof pressure-fitted into the through-hole 27 in the movable valve seat member 26. It is to be noted that, with the guide rod 58 so supported by the movable valve seat member 26 in the manner described above, one surface of the valve seat element 60 corresponding to the base of the frusto-conical shape is held tightly in contact with the end face of the movable valve seat member 26 as shown.

The cup-like valve member 61 has a blind hole 62 defined therein and a radially outwardly extending annular flange or spring seat 63 formed on one end of the valve seat member 60 opposite to the closed end thereof. This cup-like valve member 61 is axially movably mounted on the guide rod 58 with the guide block 59 received within the blind hole 62 and is normally biased to the right, that is, in a direction towards the movable valve seat member 26 by the action of the second biasing spring 45 which is seated to the radially outwardly extending annular spring seat 63. The guide block 59 larger in diameter than a portion of the guide rod 58 between it and the valve seat element 60 has a diameter so selected as to be smaller than the diameter of the blind hole 62, so that an annular clearance 64 can be formed between the peripheral surface of the guide block 59 and that of the blind hole 62.

In the embodiment shown in FIG. 4, the working chamber 41 is directly communicated with the supply chamber 20 through the radially extending connecting passages 35 and, for establishing the discharge path leading from this working chamber 41 to the fluid outlet port 22 by way of the valve chamber 19, a discharge passage 65 is defined in the guide rod 58, said discharge passage 65 having one end opening at the end face of the guide rod 58 remote from the guide block 59 and, therefore, in communication with the working chamber 41 and the other end opening at the peripheral surface of the portion between the guide block 59 and the valve seat element 60 and, therefore, in communication with annular gap 66 which is defined between the peripheral surface of the blind hole 62 and the peripheral surface of that portion of the guide rod 58 between the guide block 59 and the valve seat element 60.

From the foregoing, it will readily be seen that, during the pressure relief operation occurring in the pressure relief valve assembly according to the embodiment shown in FIG. 4, the cup-like valve member 61 is axially displaced in a direction away from the guide rod 58 with an inner peripheral edge 61a disengaging from the valve seat element 60, thereby establishing a fluid communication between the annular gap 66 and the valve chamber 19.

In any event, even the pressure relief valve assembly according to the embodiment shown in FIG. 4 functions in a manner substantially similar to that shown in FIG. 1.

Figure 5:
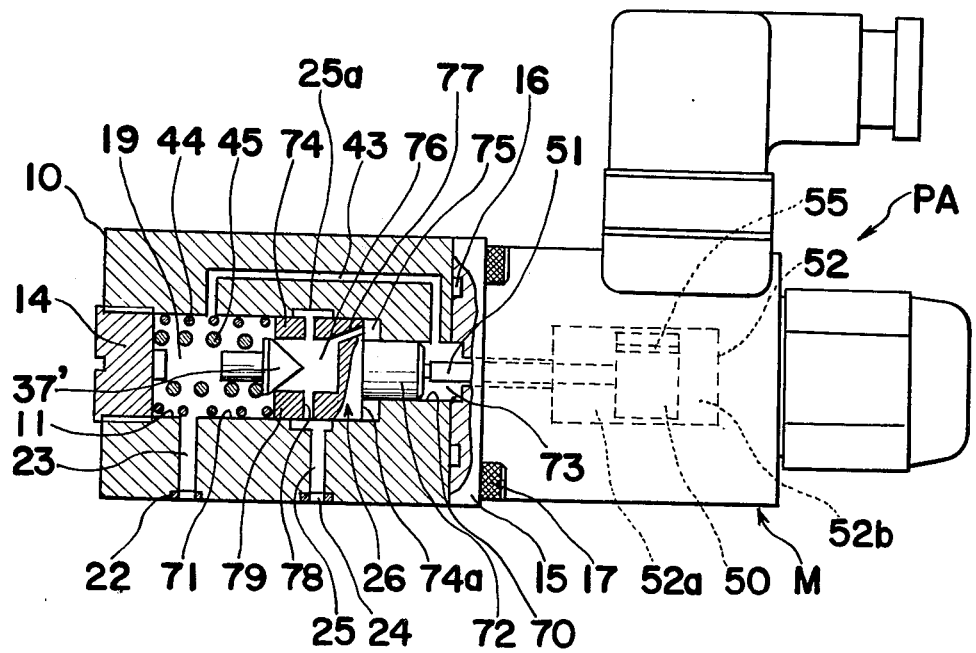

Shown in FIG. 5 is a simplified form of the pressure relief valve assembly. According to the embodiment shown in FIG. 5, the axially extending hollow 11 in the valve housing 10 is divided into a reduced diameter bore 70, positioned adjacent the end plate 15, and a large diameter bore 71 on one side of the reduced diameter bore 70 opposite to the end plate 15 and adjacent the end plate 14 which is shown in the form of a plug closing the free end of the axially extending hollow 11 opposite to the end plate 15, said reduced and large diameter bores 70 and 71 being axially aligned with each other.

The movable valve seat member 26 employed in the pressure relief valve assembly of the construction shown in FIG. 5 is in the form of a differential piston and is constituted by a reduced diameter portion 72, axially slidably inserted in the reduced diameter bore 70 to define a back pressure chamber 73 between it and the end plate 15, and a large diameter portion 74 axially slidably inserted in the large diameter bore 71 and dividing the large diameter bore 71 into a working chamber 75 and the valve chamber 19 which are positioned on respective sides of the large diameter portion 74. It is to be noted that the back pressure chamber 73 is a functional equivalent of the chamber 21 employed in the pressure relief valve assembly of the construction shown in any one of FIGS. 1, 3 and 4.

The large diameter portion 74 of the movable valve seat member 26 has a blind hole 76 defined therein and opening towards the valve chamber 19 in axial alignment with the hollow 11 and also has at least one connecting passage 77 defined therein, said connecting passage 77 having one end held in communication with the blind hole 76 and the other end opening at an annular face 74a at the stepped boundary between the reduced and large diameter portions 72 and 74 and held in communication with the working chamber 75. Preferably, the connecting passage 77 is an orifice for controlling the rate of flow of fluid medium from the blind hole 76 into the working chamber 75. In the illustrated embodiment of FIG. 5, the annular face 74a has a surface area equal to the surface area of the bottom of the blind hole 76 for a reason as will be described later.

The large diameter portion 74 also has one or more radially extending passages 78 defined therein and communicated to the blind hole 76. In order for the fluid medium supplied to the fluid inlet port 24 to be introduced into the blind hole 76 through the passages 78, an inner open end of the fluid inlet passage 25 is formed into an annular groove 25a so positioned and so sized that, throughout the entire stroke of movement of the movable valve seat member 26 in the axial direction within the hollow 11, the blind hole 76 in the enlarged diameter portion 74 can be held in communication with said annulr groove 25a through the passage 78.

In the embodiment shown in FIG. 5, instead of the valving body 36 which has been described with reference to and shown in FIGS. 1 and 3 as having the valve or poppet member 37 integrally formed therewith, a valve or poppet member 37' of generally conical shape is employed. As is the case with the valve or poppet member 37 shown in any one of FIGS. 1 and 3, this valve or poppet member 37' is seated against a valve seat 79, constituted by an inner peripheral edge of the large diameter portion 74 defining the opening of the blind hole 76, by the action of the biasing spring 45.

Even the pressure relief valve assembly of the construction shown in FIG. 5 functions in a manner substantially similar to that shown in FIG. 1. More specifically, during the operation of the pressure relief valve assembly of FIG. 5, since the surface area of the annular face 74a facing the working chamber 75 is equal to that of the bottom of the blind hole 76 and the fluid pressure acting on the annular face 74a and that acting on the bottom of the blind hole 76 remain the same irrespective of variation in pressure at the fluid inlet port 24a, a factor governing the movement of the movable valve seat member 26 includes the biasing force of the spring 44 and the axially pushing force of the push rod 51. Accordingly, once the biasing force of the spring 44 and the axially pushing force of the rod 51 are counterbalanced with each other thereby bringing the movable valve seat member 26 into the state of equilibrium, no variation in pressure at the inlet port 24 results in movement of the movable valve seat member 26.

Figure 6:
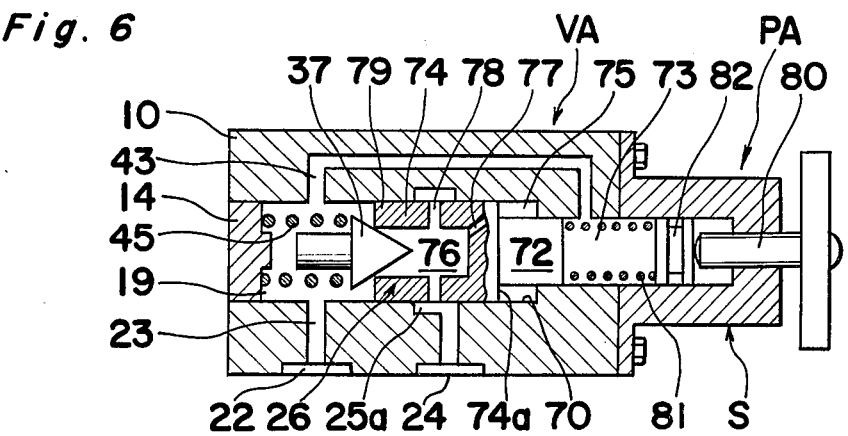

However, where the annular face 74a has a surface area smaller than that of the bottom of the blind hole 76, the first biasing spring 44 may not be employed such as shown in FIG. 6.

In addition, irrespective of whether the first biasing spring 44 is employed such as shown in FIG. 5 or whether the first biasing spring 44 is not employed such as shown in FIG. 6, the set pressure adjustment, which has been described as employed in the form of the electromagnetic unit M in the embodiment shown in FIG. 5, may comprise a manipulatable set pressure adjustment S such as shown in FIG. 6.

Referring particularly to FIG. 6, the manipulatable set pressure adjustment S comprises an adjustment screw 80 and an intermediate transmission spring 81 having one end engaged with the free end face of the reduced diameter portion 72 of the movable valve seat member 26 and the other end engaged with the tip of the adjustment screw 80 through a spring seat member 82. This manipulatable set pressure adjustment S is so designed that, by turning the adjustment screw 80, the biasing force of the intermediate transmission spring 81 can be adjusted, the biasing force of said spring 81 being determinative of the set pressure of the pressure relief valve assembly.

From the foregoing, it will readily be seen that, if the pressure relief valve assembly of the construction shown in FIG. 6 has the first biasing spring 44 such as shown in FIG. 5 and, therefore, the surface area of the annular face 74a is equal to the surface area of the bottom of the blind hole 76, the state of equilibrium of the movable valve seat member 26 can be established when the biasing force of the intermediate transmission spring 81 is counterbalanced with the biasing force of the first biasing spring 44. However, if the pressure relief valve assembly shown in FIG. 6 has no first biasing spring such as shown by 44 in FIG. 5 and, therefore, the surface area of the annular face 74a is smaller than that of the bottom of the blnd hole 76 such as shown in FIG. 6, the same state of equilibrium of the movable valve seat member 26 can be established when the biasing force of the intermediate transmission spring 81 is counterbalanced with the pressure difference between the pressure acting on the bottom of the blind hole 76 and that acting on the annular face 74a.

In the embodiment shown in any one of FIGS. 5 and 6, in order to permit the pressure introduced into the annular groove 25a to be transmitted to the annular face 74a, the annular groove 25a has been described and shown as communicated to the working chamber 75 through the passages 78 and then through the orifice or passage 77. However, without employing the passage 77, the annular groove 25a may be directly communicated to the working chamber 75 such as shown in FIG. 7 and this can readily be achieved by suitably selecting the width of the annular groove 25a.

Figure 7:
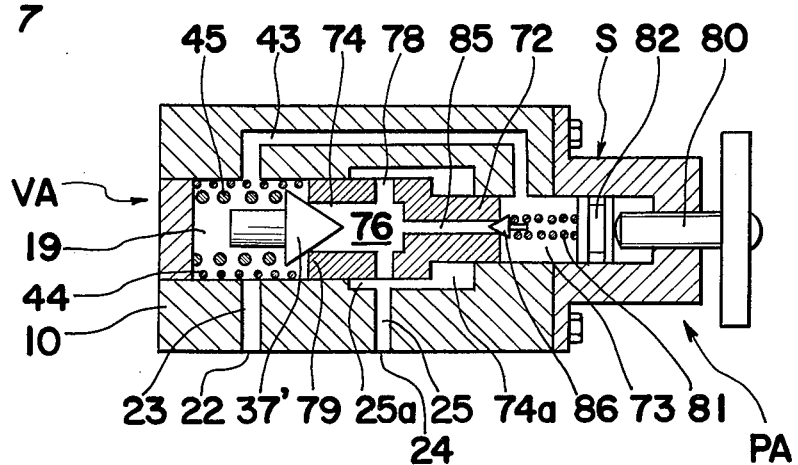

Moreover, in the embodiment shown in FIG. 6, the pressure relief valve assembly may have a safety valve built therein such as shown in FIG. 7. The safety valve shown in FIG. 7 comprises an escape passage 85, defined in the movable valve seat member 26 in coaxial relation therewith and having one end opening into the blind hole 76 and the other end opening into the back pressure chamber 73, and a valve member 86 of conical shape operatively interposed between the intemediate transmission spring 81 and the movable valve seat member 26 and biased by said intermediate transmission spring 81 so as to seat against the open end of the escape passage 85 facing the back pressure chamber 73. While the pressure relief valve assembly of the construction shown in FIG. 7 functions in a manner substantially identical with that shown in FIG. 6, the safety valve operates, only when the poppet member 37' fails to separate from the valve seat 79 for the reason well understood by those skilled in the art, to permit the pressure inside the blind hole 76 to be discharged into the valve chamber 19 through the escape passage 85 by way of the passage 43.

It is to be noted that the manipulatable set pressure adjustment S of the construction shown in each of FIGS. 6 and 7 can also be employed in the embodiment shown in any one of FIGS. 1, 3, 4 and 5 in place of the electromagnetic unit M. It is also to be noted that the electromagnetic unit M may not always be limited to such a type as described above, but may be of a type capable of exerting the magnetic attractive force, the magnitude of which is determined as a function of the electric current applied to the solenoid in the electromagnetic unit M.

From the foregoing, it has now become clear that, by applying an electric DC current to the solenoid in the electromagnetic unit M so far as the embodiments shown respectively in FIGS. 1, 3, 4 and 5 are involved, or by adjusting the biasing force of the intermediate transmission spring 81 so far as the embodiments shown respectively in FIGS. 6 and 7 are involved, the set pressure at which the pressure relief valve assembly of the present invention starts its relief operation, that is, at which the poppet member 37 or 37' disengages from the valve seat, can be determined in proportion to the amount of the applied electric current or the adjusted biasing force of the spring 81. In general, the higher the electric current applied to the solenoid or the higher the biasing force of the intermediate transmission spring 81, the higher the set pressure of the pressure relief valve assembly of the present invention.

The pressure relief valve assembly constructed according to the present invention may be used as a pilot valve for a pilot operated relief valve assembly or as an additional pilot valve for use in combination with any known pilot operated relief valve assembly. In particular, in FIG. 8, the pressure relief valve assembly of the construction shown in any one of FIGS. 1, 3 and 4 is shown as fluid-connected with the pilot operated relief valve assembly as an additional pilot valve, which will now be described.

Figure 8:
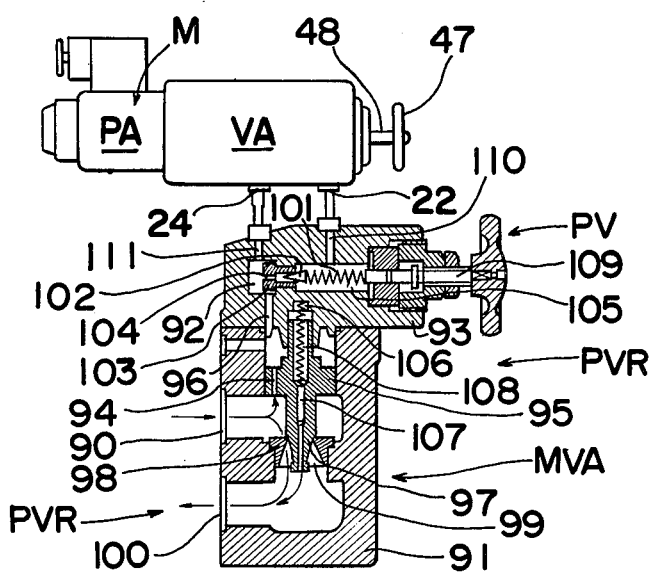
FIG. 8 illustrates an example wherein the valve assembly of the present invention is combined with a prior art pilot operated relief valve assembly.

Referring now to FIG. 8, the pilot operated relief valve assembly, generally identified by PVR, comprises a main valve body MVA and a pilot valve body PV. Since this pilot operated relief valve assembly PVR of the construction shown in FIG. 8 is well known to those skilled in the art and is in the state of prior art, the detailed description thereof will not be made herein for the sake of brevity, but it will be described in terms of the function.

The fluid pressure introduced into the pilot operation relief valve assembly PVR through an inflow opening 90 defined in a housing 91 of the main valve body MVA flows into a working chamber 92, defined in a housing 93 of the pilot valve body PV, through a choke passage 94, defined in a piston member 95 accommodated axially displaceably within the housing 91, by way of a passage 96 in the housing 93. A pressure receiving surface of the piston member 95 facing the pilot valve body PV is larger than the opposite pressure receiving surface of the same piston member 95 so that, when and so long as the fluid pressure introduced into the pilot operated relief valve assembly PVR is lower than the set pressure, a valve member 97 fast with the piston member 95 is seated against a fixed valve seat member 98 thereby closing a passage 99 defined in the fixed valve seat member 98 and leading from the fluid inflow opening 90 towards a fluid outflow opening 100 defined in the housing 91.

When the pressure so introduced into the pilot operated relief valve assembly PVR attains a value higher than the biasing force of a spring 101 in the pilot valve body PV, that is, the set pressure, a poppet 102 axially displaceably housed within the housing 91 is disengaged from a fixed valve seat member 103, thereby opening a passage 104 defined in the fixed valve seat member 103 and leading from the working chamber 92 to a discharge chamber 105 on one side of the seat member 103 opposite to the working chamber 92 and where the spring 101 is housed. The pressure so introduced from the working chamber 92 into the discharge chamber 105 during the opening of the passage 104 is then discharged to the outflow opening 100 through a passage 106 in the housing 93 and then through a passage 107 defined in the piston member 95 in coaxial relation to said piston member 95. At the same time, because of the pressure differential developed across the choke passage 94, the pressure acting on the pressure receiving surface of the piston member 95 facing the pilot valve body PV becomes lower than that acting on the opposite pressure receiving surface of the same piston member 95 and, therefore, the piston member 95 is axially upwardly shifted against a spring 108 with the valve member 97 consequently opening the passage 99.

Upon opening of the passage 99 in the manner described above, an excessive pressure exceeding the set pressure of the pilot operated relief valve assembly PVR can be discharged to the outside thereof through the outflow opening 100 on one hand and the valve member 102 in the pilot valve body PV is displaced by the action of the spring 101 to close the passage 104 in the valve seat member 103 in readiness for the next cycle of operation.

The pilot operated relief valve assembly PVR of the prior art construction so far described requires a relatively large manipulative force to adjust the set pressure, that is, the biasing force of the spring 101 because the biasing force of such spring 101 directly acts on an adjustment screw 109.

In accordance with the teaching of the present invention, the valve assembly of the construction of any one of FIGS. 1, 3 and 4 so far illustrated in FIG. 8 is fluid-coupled to the pilot valve body PV with the fluid inlet and outlet ports 24 and 22 communicated to the chambers 92 and 105 in the pilot valve body PV. In order to achieve this, the conventional pilot valve body PV forming a part of the pilot operated relief valve assembly PVR must be modified so as to have connecting passages 110 and 111 defined in the housing 93 for fluid connection with the fluid inlet and outlet ports 24 and 22, respectively, in the valve assembly of the present invention.

In the arrangement shown in FIG. 8, the valve assembly of the present invention takes the role of the pilot valve body PV and, therefore, the pilot valve body PV is not used. However, the pilot valve body PV may be utilized as an emergency set pressure adjustment in the case where the valve assembly of the present invention malfunctions.

Alternatively, the valve assembly of the present invention can be directly fluid-coupled to the main valve body MVA with the fluid inlet and outlet ports 24 and 22 communicated respectively to the passages 96 and 106.

From the foregoing description of the present invention, it has now become clear that, since the set pressure adjustment of the valve assembly of the present invention can be carried out without being influenced by the fluid pressure acting on the poppet member, the present invention is effective to provide a pressure relief valve assembly which satisfies the requirements of discharge of a relatively large amount of fluid pressure per unit time. One method to achieve this is to employ the movable valve seat member having a relatively large bore size.

In addition, so far as the embodiments wherein the set pressure adjustment is employed in the form of the electromagnetic unit are concerned, the valve assembly of the present invention can be used as a remote controlled relief valve assembly of which the set pressure can be electrically or electro-mechanically controlled at the place remote from where it is installed.

Although the present invention has fully been described in connection with the various preferred embodiments thereof with reference to and shown in the accompanying drawings, it is to be noted that various changes and modifications are apparent to those skilled in the art. By way of example, in order to avoid any adverse influence which the back pressure in the valve chamber 19 may exert on the movable valve seat member 26, an effective pressure receiving surface on one end of the movable valve seat member 26 adjacent the valve chamber 19 and the opposite effective pressure receiving surface on the opposite end of the same movable valve seat member 26 may be made equal to each other. In addition, in order to enhance the braking effect to be imposed on the movement of the movable valve seat member 26, one or both of the passages 55 (FIG. 1) and 77 (FIGS. 5 and 6) are preferably employed in the form of an orifice or constricted passage.

In the description concerning the embodiments shown respectively in FIGS. 1 and 3, the slider 39 may not be always necessary and, if desired, may be omitted. However, the use of the slider 39 is advantageous in that the movement of the poppet member 37 is steadily guided.

The safety valve constituted by the elements 85 and 86 and employed in the embodiment shown in FIG. 7 may not be always necessary or it may equally be employed in any one of the embodiments shown in FIGS. 1, 3 and 4, respectively.

Moreover, the orifice or passage 55 which has been described as defined in the armature 50 may be deleted if the armature 50 is of a size smaller than the bore of the compartment 52 and axially movably guided by a rod member on which it is mounted.

Furthermore, although it has been described that the first biasing spring 44 may be deleted if, in the embodiment shown in any one of FIGS. 1, 3 and 4, the sum of the surface area of the inside surface of the plug 31 facing the working chamber 41 and that of the annular face 30 in the movable valve seat member 26 is larger than the surface area of the annular face 29 in the movable valve seat member 26 or if, in the embodiment shown in any one of FIGS. 5 and 6, the annular face 74a has a surface area smaller than that of the bottom of the blind hole 76, the first biasing spring 44 if employed may be of a type having a relatively small spring constant as compared with the case wherein the first biasing spring 44 is employed while the sum of the surface area of the inside surface of the plug 31 and that of the annular face 30 is equal to the surface area of the annular face 29 or the annular face 74a has a surface area equal to that of the bottom of the blind hole 76.

Accordingly, such changes and modifications are to be understood as included within the true scope of the present invention unless they depart therefrom.

What is claimed is:

1. A pressure control valve assembly which comprises, in combination:
    a valve housing having a substantially elongated compartment defined therein, said compartment being divided into a large diameter bore and a reduced diameter bore with a first radially extending annular face defined therebetween, said large and reduced diameter bores being coaxial with each other;
    a substantially elongated movable valve seat member having its opposite ends formed into a large diameter portion and a reduced diameter portion with a second radially extending annular face defined therebetween, said movable valve seat member being axially movably housed within the compartment with said large and reduced diameter portions movably, but fluid-tightly inserted respectively in the large and reduced diameter bores, said compartment with the movable valve seat member so housed therein having a valve chamber defined within the large diameter bore and positioned between one of the opposite ends of the compartment and a free end of the large diameter portion opposite to the reduced diameter portion, a first annular working chamber defined within the large diameter bore around the reduced diameter portion and between the first and second annular faces, and a back pressure chamber defined within the reduced diameter bore and positioned between the other of the opposed ends of the compartment and a free end of the reduced diameter portion opposite to the large diameter portion, said large diameter portion having an axially extending blind hole defined therein and having its opening facing towards the valve chamber;
    a fluid inlet port means and a fluid outlet port means both defined in the valve housing, said fluid outlet port means being communicated to the valve chamber and leading to the outside of the valve housing;
    a first passage means defined in the movable valve seat member, said blind hole being communicated through the first passage means to the fluid inlet port means irrespective of the axial movement of the movable valve seat member;
    a second passage means extending between the valve chamber and the back pressure chamber for balancing the pressure within the valve chamber and the pressure within the back pressure chamber with each other;
    a valving means operatively housed within the valve chamber for displacement in a direction axially of the blind hole for selectively opening and closing the opening of the blind hole;
    a primary biasing spring interposed between said one of the opposite ends of the compartment and the valving means for biasing the valving means in one direction to close the opening of the blind hole, said valving means being displaced in the opposite direction to open the opening of the blind hole against the primary biasing spring to communicate the fluid inlet port means to the fluid outlet port means through the blind hole and then through the valve chamber when the pressure inside the blind hole attains a predetermined value sufficient to overcome the biasing force of the primary biasing spring;
    means for exerting an axial pushing force to be applied to the movable valve seat chamber to move the latter in a direction towards said one of the opposite ends of the compartment;
    a biasing means for exerting an axial biasing force on the movable valve seat member to move the latter in a direction counter to the direction of the axial pushing force; and
    a fluid circuit incorporated in the valve housing for holding the movable valve seat member in a state of equilibrium irrespective of variation in pressure supplied to the inlet port means and when the axial biasing force is counterbalanced with the axial pushing force.

2. A pressure control valve assembly as claimed in claim 1, wherein said axial pushing force exerting means comprises an electromagnetic actuator having a solenoid and a reciprocately movable armature, said solenoid capable of exerting a magnetic force necessary to move the armature, the magnitude of said magnetic force being a function of the amount of an electric DC current supplied thereto, and a transmission means for transmitting the axial pushing force to the movable valve seat member, said transmission means including a push rod having one end coupled to the armature and the other end extending into the back pressure chamber and connected to the free end of the reduced diameter portion.

3. A pressure control valve assembly as claimed in claim 1, wherein said axial pushing force exerting means comprises a threaded adjustment element adjustably supported by the valve housing for axial movement into and out of the back pressure chamber, an outer end of said threaded adjustment accessible to an operator of the valve assembly, and a transmission means for transmitting the axial pushing force to the movable valve seat member, said transmission means including a transmission spring interposed between an inner end of the the threaded adjustment element and the free end of the reduced diameter portion.

4. A valve assembly as claimed in any one of claims 1 to 3, wherein said fluid current is constituted by a control passage defined in the large diameter portion and communicating between the blind hole and the first annular working chamber.

5. A valve assembly as claimed in claim 4, wherein the surface area of the second annular face is equal to the surface area of the bottom of the blind hole, and wherein said biasing means is constituted by an auxiliary biasing spring interposed between said one of the opposite ends of the compartment and the free end of the large diameter portion, said auxiliary biasing spring having a spring constant smaller than that of the primary biasing spring.

6. A valve assembly as claimed in claim 4, wherein the surface area of the second annular face is smaller than the surface area of the bottom of the blind hole, and wherein said biasing means is constituted by a pressure difference between the fluid pressure acting on the bottom of the blind hole and the fluid pressure acting on the second annular face.

7. A valve assembly as claimed in any one of claims 1 to 3, wherein said fluid circuit is constituted by a third passage means defined in the valve housing and communicating between the fluid inlet port means and the first annular working chamber.

8. A valve assembly as claimed in claim 7, further comprising a safety valve unit including an escape passage defined in the movable valve seat member and communicating between the blind hole and the back-pressure chamber, and a valving element operatively housed within the back-pressure chamber for selectively opening and closing the escape passage, said valving element being normally biased by the action of the axial pushing force to close the escape passage, said valving element being axially displaced to open the escape passage to establish a fluid communication between the escape passage and the fluid outlet port means through the backpressure chamber and then through the second passage means only when the valving means fails to open the opening of the blind hole.

9. A valve assembly as claimed in claim 4, wherein said control passage is constituted by an orifice.

10. A valve assembly as claimed in any one of claims 1 to 3, wherein a substantially intermediate portion of the movable valve seat member between the large and reduced diameter portions is radially inwardly recessed to provide an annular groove, said annular groove forming the fluid circuit and being continuous to and in communication with the first annular working chamber, an annular end wall of the large diameter portion adjacent the annular groove forming the second annular face and an annular end wall of the reduced diameter portion adjacent the annular groove forming a third annular face in opposition to the second annular face, said first passage means having one end opening towards the blind hole and the other end opening towards the first working chamber.

11. A valve assembly as claimed in claim 10, wherein the surface area of the second annular face is equal to the sum of the surface area of the third annular face and that of the bottom of the blind hole, and wherein said biasing means is constituted by an axially biasing spring interposed between the free end of the large diameter portion and said one of the opposite ends of the compartment, said auxiliary biasing spring having a spring constant smaller than that of the primary biasing spring.

12. A valve assembly as claimed in claim 10, wherein the surface area of the second annular face is smaller than the sum of the surface area of the third annular face and that of the bottom of the blind hole, and wherein said biasing means is constituted by a pressure difference between the sum of the fluid pressure acting on the bottom of the blind hole and the fluid pressure acting on the third annular face minus the pressure acting on the second annular face.

13. A valve assembly as claimed in any one of claims 1 to 3, wherein the valving means is constituted by a generally conical valve element having an apex portion, said generally conical valve element being disposed within the valve chamber with the apex portion protruding partly into the blind hole.

14. A valve assembly as claimed in any one of claims 1 to 3, wherein the valving means is constituted by a valving rod having one end inserted into the blind hole and terminating at a position spaced a distance from the bottom of the blind hole to provide a second working chamber within the blind hole and between it and the bottom of the blind hole, said valving rod also having a generally frusto-conical valving element extending radially outwardly therefrom and rigidly mounted on the other end of the valving rod, said frusto-conical valving element serving to selectively open and close the opening of the blind hole.

15. A valve assembly as claimed in claim 14, further comprising a third passage means defined in the valving rod, said third passage means having one end constantly communicated to the first passage means irrespective of the axial movement of the valving rod and the other end opening towards and in communication with the second working chamber.

16. A valve assembly as claimed in claim 15, wherein a substantially intermediate portion of the valving rod between the valving element and said one end of the valving rod is radially inwardly recessed to provide an annular recess, said one end of the third passage means being communicated to the first passage means through said annular recess.

17. A valve assembly as claimed in claim 16, wherein said one end of the valving rod has a diameter substantially equal to the diameter of the blind hole.

18. A valve assembly as claimed in claim 16, wherein said one end of the valving rod has a diameter smaller than the diameter of the blind hole, said second working chamber being communicated to the first passage means through an annular clearance formed between the outer peripheral surfaces of the respective valving rod and blind hole, said annular clearance serving as an annular constricted passage.

19. A valve assembly as claimed in any one of claims 1 to 3, wherein the valving means is constituted by a rod member having a valve seat element rigidly mounted on a substantially intermediate portion thereof, said rod member also having one end pressure-fitted into the blind hole with the valve seat element fluid-tightly held in contact with the free end of the movable valve seat member, said one end of the rod member so fitted terminating at a position spaced a distance from the bottom of the blind hole thereby defining a third working chamber between it and the bottom of the blind hole, said third working chamber being communicated to the first passage means, said rod member further having a fourth passage means defined therein and having one end communicated to the third working chamber and the other end opening at the other end of the rod member, and a generally cup-like valving element mounted on the other end of the rod member for axial displacement relative to the rod member, said valving element being normally biased by the primary biasing spring against the valve seat element.

20. A valve assembly as claimed in claim 19, wherein a portion of the rod member between the valving element and the other end thereof is radially inwardly recessed to provide a reduced diameter portion, said other end of the fourth passage means opening on the peripheral face of the reduced diameter portion and communicatable to the valve chamber by way of an annular passage formed between the inner peripheral surface of the cup-like valving element and the peripheral surface of the reduced diameter portion of the rod member.

21. A valve assembly as claimed in any one of claims 1 to 3, further comprising a pilot operated relief valve assembly of a construction known per se, said pilot operated relief valve assembly being comprised of a main valve body and a pilot valve body having a valving element and first and second pressure chambers one on each side of the valving element of the pilot valve body, said first pressure chamber of the pilot valve body being communicated to a fluid inflow port of the pilot operated relief valve assembly and said second pressure chamber of the pilot valve body being communicatable to a fluid outflow port of the pilot operated relief valve assembly, and wherein the fluid inlet and outlet port means of the pressure control valve assembly are fluid-connected respectively to the first and second pressure chambers of the pilot valve body.

* * * * *